(12) United States Patent
Inman et al.

(10) Patent No.: US 10,546,662 B2
(45) Date of Patent: Jan. 28, 2020

(54) UPPER VESSEL TRANSPORT

(71) Applicant: BWXT mPower, Inc., Charlotte, NC (US)

(72) Inventors: James Inman, Forest, VA (US); Scott Shargots, Forest, VA (US); James McNulty, Boonsboro, MD (US); Martin Reifschneider, Monrovia, MD (US); John Smith, Boonsboro, MD (US)

(73) Assignee: BWXT mPower, Inc., Charlotte, NC (US)

( * ) Notice: Subject to any disclaimer, the term of this patent is extended or adjusted under 35 U.S.C. 154(b) by 1691 days.

(21) Appl. No.: 14/209,421

(22) Filed: Mar. 13, 2014

(65) Prior Publication Data

US 2019/0392958 A1 Dec. 26, 2019

Related U.S. Application Data

(60) Provisional application No. 61/789,605, filed on Mar. 15, 2013.

(51) Int. Cl.
  *G21C 19/00* (2006.01)
  *G21C 19/02* (2006.01)
  (Continued)

(52) U.S. Cl.
  CPC ............ *G21C 19/20* (2013.01); *G21C 19/00* (2013.01); *G21C 19/02* (2013.01); *G21C 1/32* (2013.01); *G21C 19/10* (2013.01); *G21C 19/205* (2013.01)

(58) Field of Classification Search
  CPC ........ G21C 19/10; G21C 19/20; G21C 19/24; G21C 19/34; G21C 19/205; G21C 19/00;
  (Continued)

(56) References Cited

U.S. PATENT DOCUMENTS 2,848,404 A 8/1958 Treshow
3,212,979 A 10/1965 Silverblatt
(Continued)

FOREIGN PATENT DOCUMENTS

JP S6113187 A 1/1986

OTHER PUBLICATIONS

NuScale Power, "Refueling Operations Report for the NuScale Power Module", Rev. 0, Mar. 2009.*
(Continued)

*Primary Examiner* — Jack W Keith
*Assistant Examiner* — Sandra Herrick
(74) *Attorney, Agent, or Firm* — Nelson Mullins Riley & Scarborough LLP

(57) ABSTRACT

A system for refueling a nuclear reactor is provided. The system includes a lower reactor vessel with a plurality of fuel rods and a plurality of control rods disposed therein, the lower reactor vessel further comprising an upper flange. An upper reactor vessel is provided which encloses a steam generator and a pressurizer, the upper reactor vessel further comprising a lower flange that matingly engages the upper flange of the lower reactor vessel. A transporter surrounds an outer surface of the upper reactor vessel, wherein the transporter is configured to translate the upper reactor vessel vertically toward and away from the lower reactor vessel and also to translate the upper reactor vessel horizontally toward or away from alignment with the lower reactor vessel.

11 Claims, 10 Drawing Sheets

(51) Int. Cl.
*G21C 19/10* (2006.01)
*G21C 19/20* (2006.01)
*G21C 1/32* (2006.01)

(58) Field of Classification Search
CPC .......... G21C 19/02; G21C 19/19; G21C 1/32; G21C 1/328; G21D 1/00; G21D 1/02
USPC ........ 376/260, 262, 263, 264, 270, 271, 267
See application file for complete search history.

(56) References Cited

U.S. PATENT DOCUMENTS

| | | | |
|---|---|---|---|
| 3,325,374 A | 6/1967 | Margen | |
| 4,072,563 A | 2/1978 | McDonald et al. | |
| 4,427,623 A * | 1/1984 | Howard .................. | B66C 13/46 376/258 |
| 4,649,868 A | 3/1987 | Smith, Jr. | |
| 4,778,645 A | 10/1988 | Altman et al. | |
| 4,847,038 A | 7/1989 | Martin | |
| 4,991,280 A * | 2/1991 | Reimer .................... | B23H 9/00 29/402.06 |
| 5,043,132 A * | 8/1991 | Schramm .................. | B66C 1/12 376/260 |
| 5,328,667 A | 7/1994 | Johnson | |
| 5,574,759 A | 11/1996 | Dietrich et al. | |
| 5,600,686 A | 2/1997 | Stoss | |
| 5,774,513 A | 6/1998 | Urko | |
| 5,930,318 A | 7/1999 | Baversten et al. | |
| 5,960,051 A | 9/1999 | Challberg et al. | |
| 6,198,787 B1 | 3/2001 | Hasegawa et al. | |
| 6,252,922 B1 | 6/2001 | Hasegawa et al. | |
| 6,608,879 B2 | 8/2003 | Aoki et al. | |
| 6,625,245 B1 | 9/2003 | Aoki et al. | |
| 6,643,349 B2 | 11/2003 | Aoki et al. | |
| 6,744,841 B1 | 6/2004 | Aoki et al. | |
| 6,856,663 B2 | 2/2005 | Colditz et al. | |
| 6,856,664 B2 | 2/2005 | Pence et al. | |
| 7,139,357 B2 | 11/2006 | Colditz et al. | |
| 2009/0245451 A1 * | 10/2009 | Funkhouser ............ | B66C 17/06 376/260 |
| 2010/0067644 A1 * | 3/2010 | D'Auvergne ............ | G21C 3/30 376/294 |
| 2010/0150294 A1 | 6/2010 | Weisel et al. | |
| 2010/0316177 A1 | 12/2010 | Stambaugh et al. | |
| 2011/0235768 A1 | 9/2011 | Heim et al. | |
| 2012/0027155 A1 * | 2/2012 | Kamath .................. | G21C 11/00 376/263 |
| 2012/0076254 A1 | 3/2012 | Malloy et al. | |
| 2012/0294405 A1 | 11/2012 | Shargots | |
| 2013/0044850 A1 | 2/2013 | Walton et al. | |
| 2013/0294565 A1 * | 11/2013 | Harkness ............... | G21C 19/20 376/268 |
| 2013/0301779 A1 * | 11/2013 | Shargots ................ | G21C 1/322 376/262 |
| 2014/0023171 A1 * | 1/2014 | Arai ....................... | G21C 19/10 376/268 |

OTHER PUBLICATIONS

Kaeri, Status report 77—System-Integrated Modular Advanced Reactor (SMART), Apr. 4, 2011.*
International Search Report and Written Opinion for PCT/US2014/026117 dated Nov. 20, 2014.
European Extended Search Report dated Oct. 28, 2016 for EP Application No. 14807958.5.
Office Action dated Apr. 21, 2016 for U.S. Appl. No. 13/862,112.
International Search Report and Written Opinion for PCT/US2013/036570 dated Sep. 17, 2013.

* cited by examiner

UPPER VESSEL TRANSPORT

CROSS-REFERENCE TO RELATED APPLICATIONS

This application claims priority from U.S. Provisional Application No. 61/789,605, filed on Mar. 15, 2013, the entirety of which is hereby fully incorporated by reference herein.

TECHNICAL FIELD

This disclosure is related to nuclear reactor plants, and specifically nuclear reactor plants that are configured to have a primary containment that is configured to be separable for ease of refueling, inspection, and maintenance.

BRIEF SUMMARY

A first representative embodiment of the disclosure is provided. The embodiment includes a system for refueling a nuclear reactor. The system includes a lower reactor vessel comprising a plurality of fuel rods and a plurality of control rods disposed therein, the lower reactor vessel further comprises an upper flange. An upper reactor vessel comprises a steam generator and pressurizer disposed therein. The upper reactor vessel further comprises a lower flange that matingly engages the upper flange of the lower reactor vessel. A transporter surrounds an outer surface of the upper reactor vessel. The transporter is configured to translate the upper reactor vessel vertically toward and away from the lower reactor vessel and also to translate the upper reactor vessel horizontally toward or away from alignment with the lower reactor vessel.

Another representative embodiment of the disclosure is provided. The embodiment includes providing a nuclear reactor primary plant within a stationary lower reactor vessel that encloses a plurality of fuel rods and a plurality of control rods, the lower reactor vessel comprising an open top defined by a first flange. The method further includes providing a movable upper reactor vessel that encloses a steam generator and pressurizer, the upper reactor vessel comprising an open bottom defined by a second flange that matingly engages the first flange during normal operation of the nuclear reactor. The method additionally includes providing a transporter further comprising at least first and second sets of rollers mounted upon respective first and second horizontal tracks that are disposed upon opposite sides of the upper reactor vessel. The method further includes providing one or more lifts disposed between the collar and the first and second sets of rollers, wherein operation of the lifting mechanism changes the vertical position of the upper reactor vessel with respect to the horizontal tracks.

Another representative embodiment of the disclosure is provided. The embodiment provides a method of refueling a nuclear reactor. The method includes shutting down and cooling down the nuclear reactor, establishing a long term decay heat removal system in thermal communication with the nuclear reactor, and isolating a reactor vessel from a steam system and a feedwater system connected to the nuclear reactor during normal operation of the nuclear reactor. The method further comprises disconnecting a lower reactor vessel enclosing nuclear fuel and a plurality of control rods from an upper reactor vessel enclosing a steam generator and a pressurizer disposed above the lower reactor vessel. The method further includes lifting the upper reactor vessel upwardly from the lower reactor vessel and sliding the upper reactor vessel away from the lower reactor vessel, to allow access to the lower reactor vessel to remove used or spent nuclear fuel and/or add new nuclear fuel, wherein the upper reactor vessel is surrounded by a transporter, the transporter is slidably connected to first and second rails disposed upon opposite sides of the upper reactor vessel, and the transporter further comprises one or more lifts to upwardly translate the upper reactor vessel away from the lower reactor vessel.

Advantages of the present disclosure will become more apparent to those skilled in the art from the following description of the preferred embodiments of the disclosure that have been shown and described by way of illustration. As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE DRAWINGS AND THE PRESENTLY PREFERRED EMBODIMENTS

Turning now to FIGS. 1-10, a nuclear reactor 10 is shown. The nuclear reactor 10 may be a pressurized water reactor (PWR), boiling water reactor (BWR), or other types of reactor plants known in the art, such as various types of light water reactors. While one of ordinary skill in the art will appreciate upon detailed review of the subject specification and figures that the disclosed subject matter is applicable to a multitude of different types of nuclear plant designs, the subject specification is described herein with reference to a pressurized water reactor, and more specifically, a small modular reactor.

Figure 1:
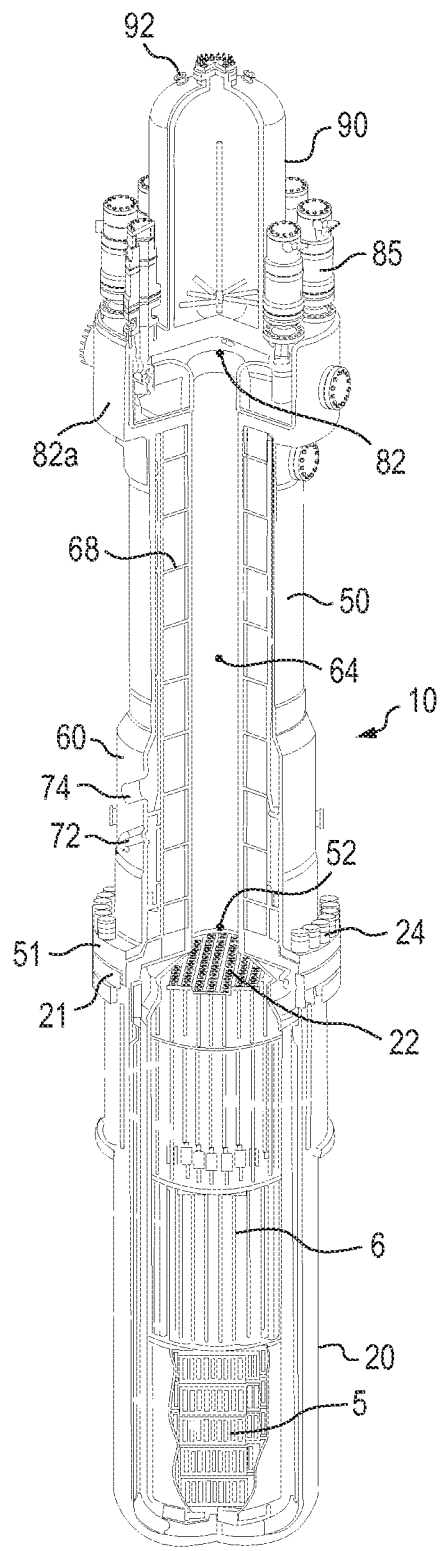
FIG. 1 is a perspective cutaway view of a nuclear reactor vessel with a portion of an upper reactor vessel and a portion of a lower reactor vessel removed.

With specific reference to FIG. 1, the nuclear reactor 10 includes a lower reactor vessel 20 and an upper reactor vessel 50 disposed above the lower reactor vessel 20. The lower reactor vessel 20 encloses the nuclear fuel, normally disposed within a plurality of fuel rods 5, and a plurality of control rods (depicted as disposed within control rod guide frames 6) that are slidingly disposed in conjunction with the plurality of fuel rods 5 to control the operation of the nuclear reactor (in conjunction with other portions of the power plant). The lower reactor vessel 20 is maintained full of subcooled primary coolant that is circulated therethrough and through the upper reactor vessel 50, which may be disposed directly above the lower reactor vessel 20.

The upper reactor vessel 50 encloses a steam generator 60 and a pressurizer 90 that is normally disposed within the very top portion of the upper reactor vessel 50. The steam generator 60 is configured to receive the hot primary coolant (which flows from the lower reactor vessel 20 normally through an inner central riser 64), through a plurality of parallel reactor coolant pumps 85, and with parallel flow through a plurality of steam generator tubes 68 disposed outboard of the central riser 64. The steam generator 60 includes a secondary portion that receives an input of feedwater through a feed input 72. The feedwater flows around the outside of the plurality of heat tubes 68 and boils to steam due to heat transfer from the hot primary coolant flowing through the heat tubes 68. The steam created within the steam generator 60 (which may be high quality steam, or in other embodiments superheated steam) leaves the steam generator 60 through one or more steam outlets 74. The steam leaving the steam generator 60 is piped to a plurality of turbines (not shown, which may be within or outside of the containment 1, shown in FIGS. 3 and 4) to generate electrical power. The steam powering the turbines is condensed and pumped back to steam generator 60 as feedwater to continue the cycle.

The upper reactor vessel 50 may further include a pressurizer 90, which is fluidly connected to the primary coolant system, such as in direct fluid communication with the primary coolant within the upper reactor vessel 50, such as in the central riser 64 or the primary tube sheet 82. The pressurizer 90 includes a plurality of heaters that are constantly and/or cyclically operated to increase the temperature of the water therein to saturation temperature of the primary coolant for the given pressure of the primary coolant within the pressurizer 90. By forming a steam "bubble" within the top of the pressurizer, the remainder of the primary coolant, which is at a lower temperature, but the same pressure as the coolant within the pressurizer 90 remains a subcooled liquid, as necessary for removing sufficient heat from the fuel rods to remove the heat produced within the lower reactor vessel 20. The flow of primary coolant through the upper and lower reactor vessels 20, 50 is urged by a plurality of reactor coolant pumps 85, which are normally disposed within the upper reactor vessel 50, and specifically may take suction from or propel primary coolant into the tube sheet 82 of the steam generator 60, such that heated primary coolant is urged into parallel flow through the plurality of tubes 68 in the steam generator 60.

As best shown in FIG. 1, the lower reactor vessel 20 forms a primary containment for the nuclear fuel and the primary coolant disposed within the lower reactor vessel 20 during normal operation of the reactor 10. In some embodiments, the lower reactor vessel 20 is formed to minimize the number of penetrations through the side walls thereof, for various purposes such as to limit or eliminate the potential for a loss of coolant from the nuclear reactor 10. The top of the lower reactor vessel 20 is open with an upper flange 21 disposed around the opening 22 into the lower reactor vessel 20.

The upper reactor vessel 50 may be disposed directly above the lower reactor vessel 20, with the upper reactor vessel 50 including a lower flange 51 that matingly engages the upper flange 21 of the lower reactor vessel 20. The upper reactor vessel 50 includes an opening 52 that allows for primary coolant flow from the lower reactor vessel 20 and into the upflow portion 64, and flow from the plurality of parallel tubes 68 to return to the lower reactor vessel 20. As appreciated with review of FIG. 1, the respective openings 22, 52 of the lower and upper reactor vessels 20, 50 are in communication with each other when the upper flange 21 and lower flange 51 of the lower reactor vessel 20 and upper reactor vessel 50, respectively, are coupled or fixed together. In some embodiments, the upper flange 21 and lower flange 51 of the lower reactor vessel 20 and upper reactor vessel 50, respectively, may be fixed together with a plurality of fasteners 24 that extend above the lower flange 51 and connect either through the upper and lower flanges 21, 51, or alternatively are received within a respective threaded aperture in the upper flange 21.

Figure 2:
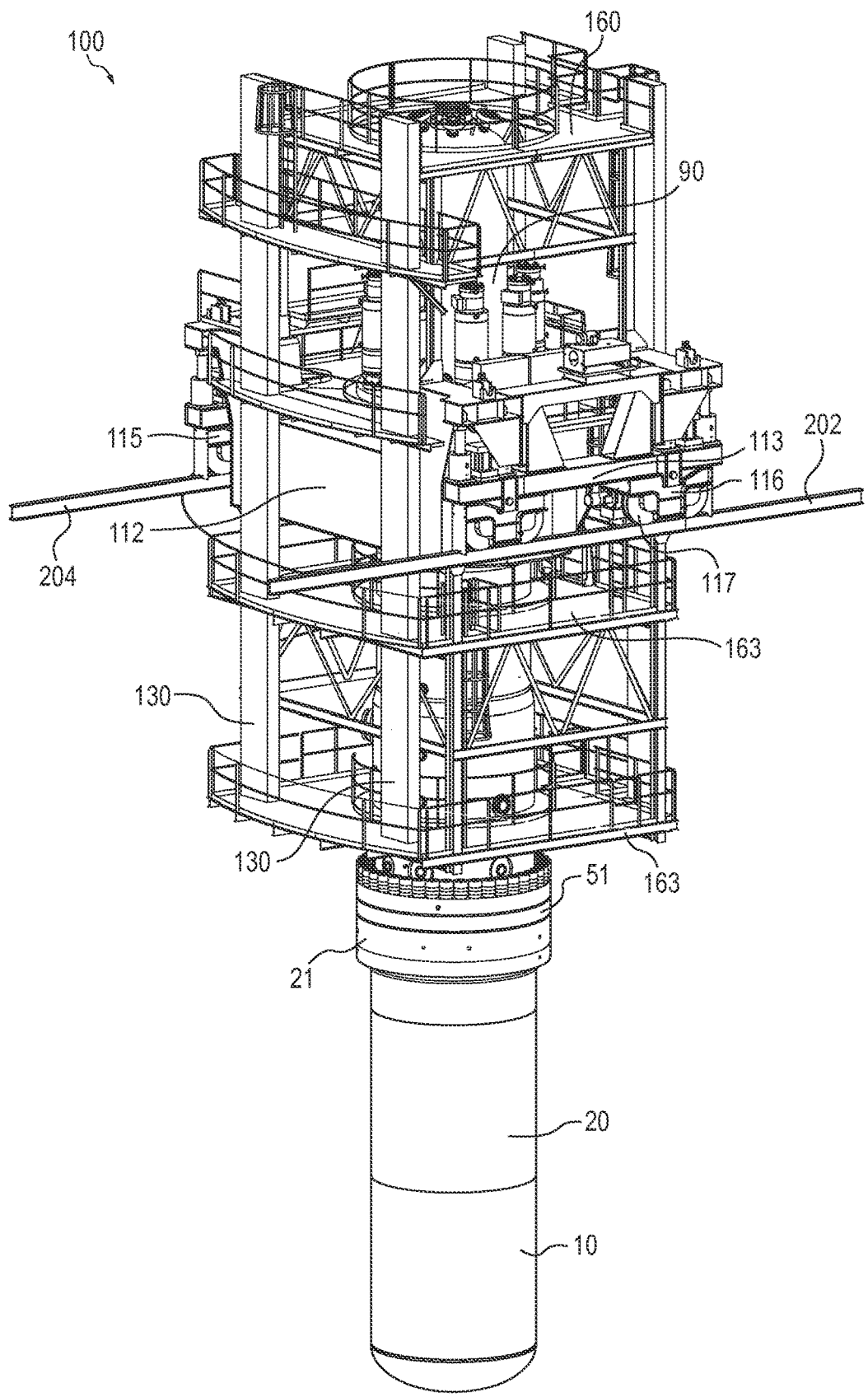
FIG. 2 is a perspective view of the nuclear reactor vessel of FIG. 1 in conjunction with a transporter in accordance with an embodiment of the present invention.
Figure 3:
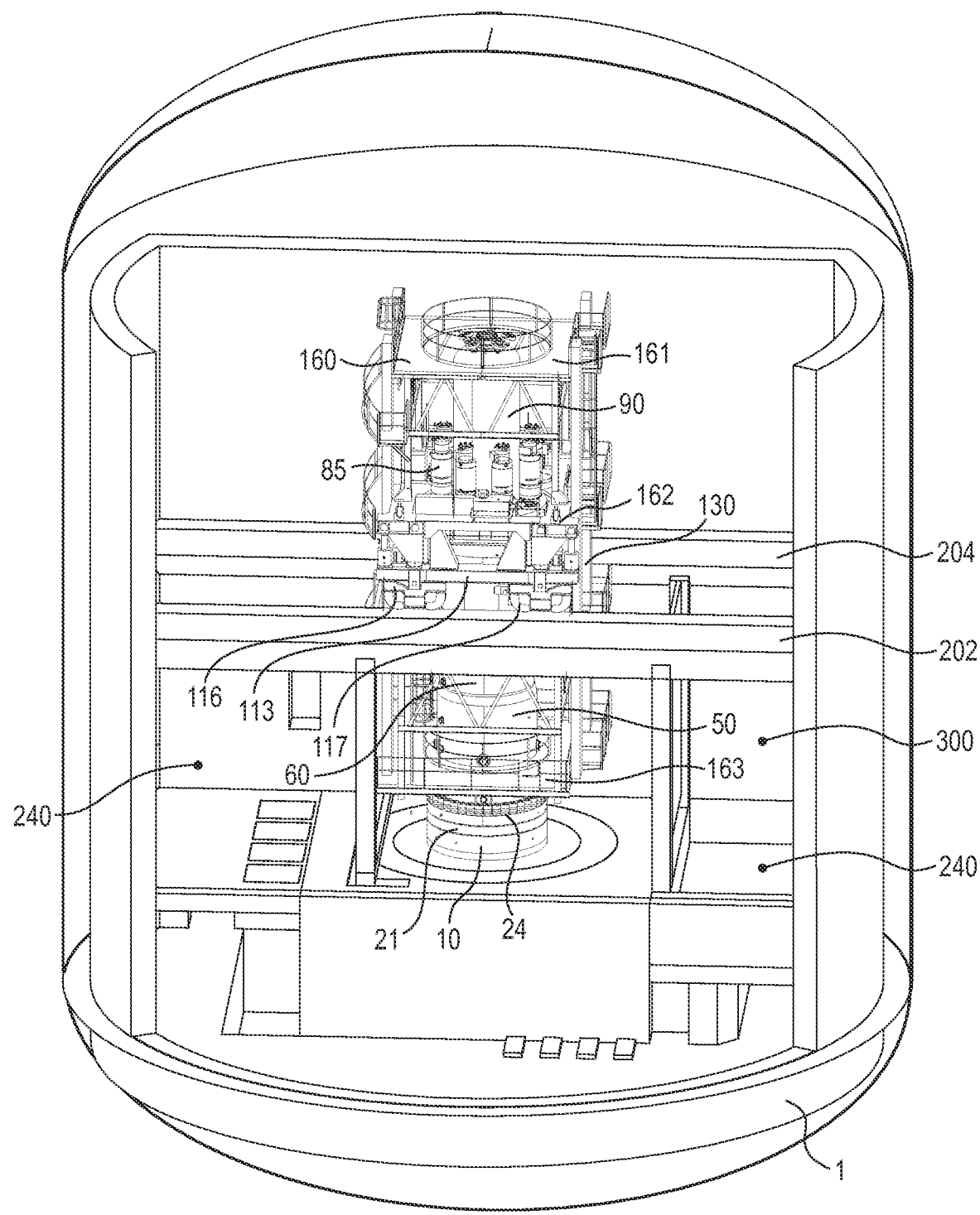
FIG. 3 is a perspective view of the reactor vessel and transporter disposed within a containment with the reactor vessel and transporter in the operating configuration.
Figure 4:
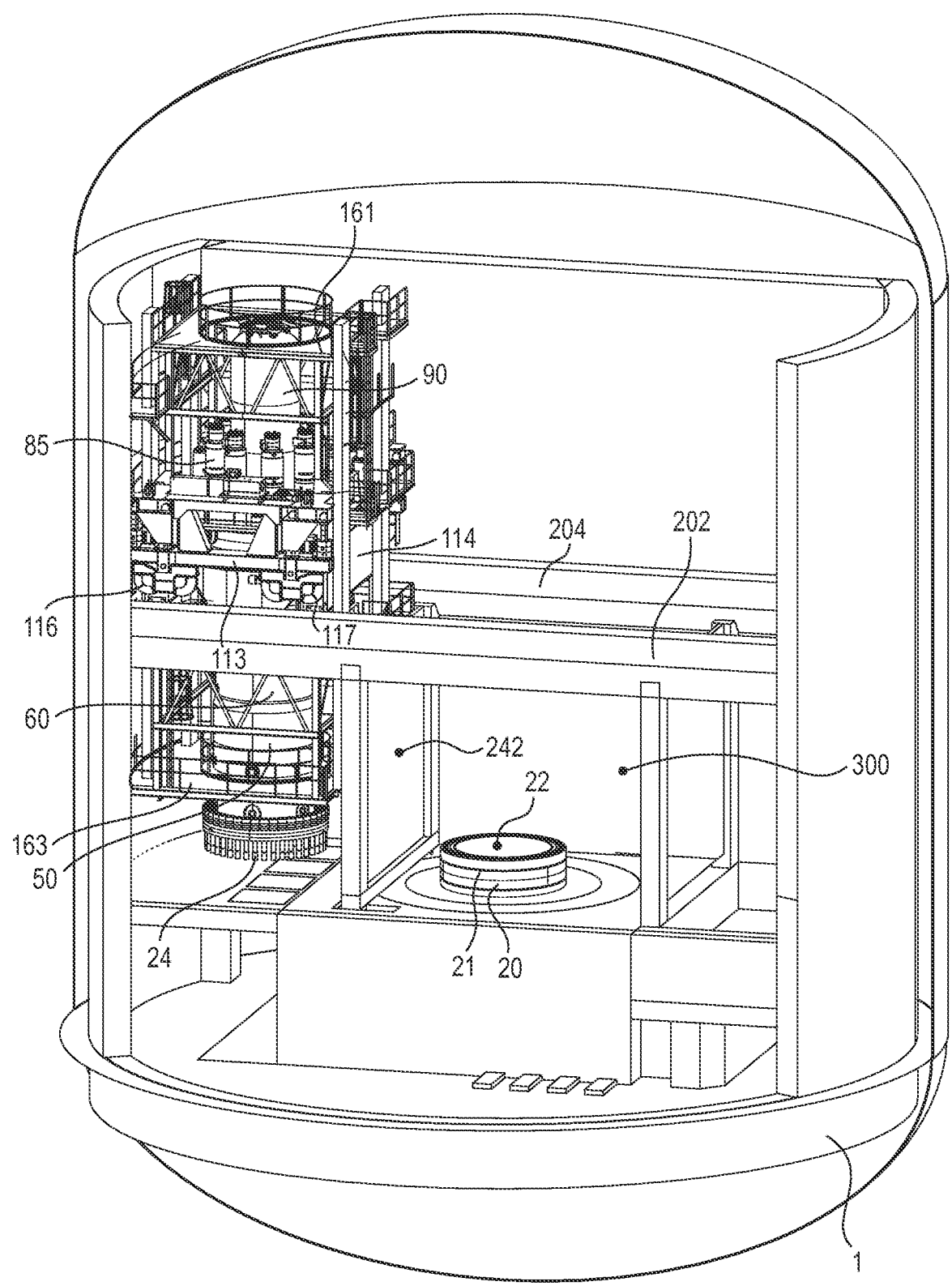
FIG. 4 is the view of FIG. 3 in the refueling configuration.

A shown in FIGS. 2-4, a transporter 100 may be disposed around the upper reactor vessel 50 and connectable therewith to cause one or both of vertical translation of the upper reactor vessel 50 away from the lower reactor vessel 20 and horizontal translation of the upper reactor vessel 50 away from the lower reactor vessel 20.

The transporter 100 may be removably connectable to the upper reactor vessel 50, such that during normal operation of the nuclear reactor 10 the transporter does not make contact with the upper reactor vessel 50. The transporter 100 is maintained in place surrounding portions of the upper reactor vessel 50 such that the transporter 100 may quickly and conveniently be configured to contact and vertically translate (with one or more lifts 120, discussed below) and/or horizontally translate the upper reactor vessel 50 (including all components disposed therein) to allow for convenient refueling of the lower reactor vessel 20 and convenient inspection and/or maintenance of the upper reactor vessel 50.

Figure 5:
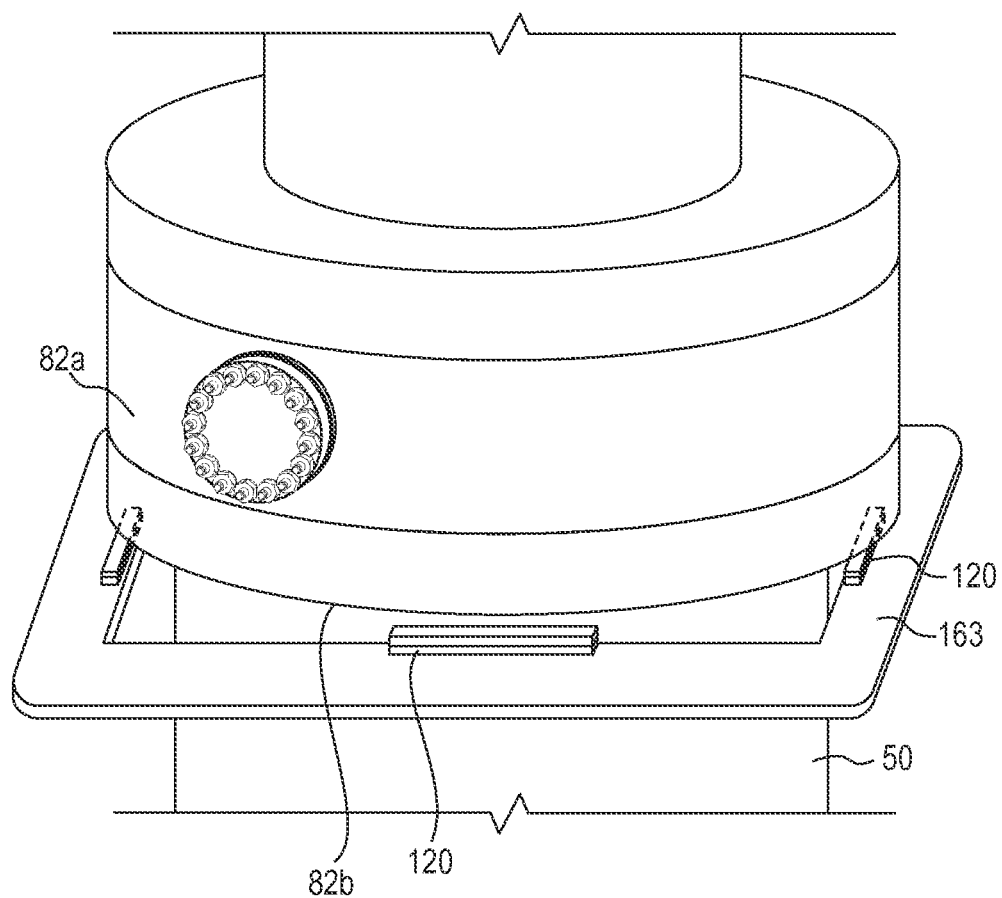
FIG. 5 is a schematic view of a portion of the upper reactor vessel of FIG. 2 disposed in conjunction with a plurality of lifts not in engagement with the upper reactor vessel.
Figure 6:
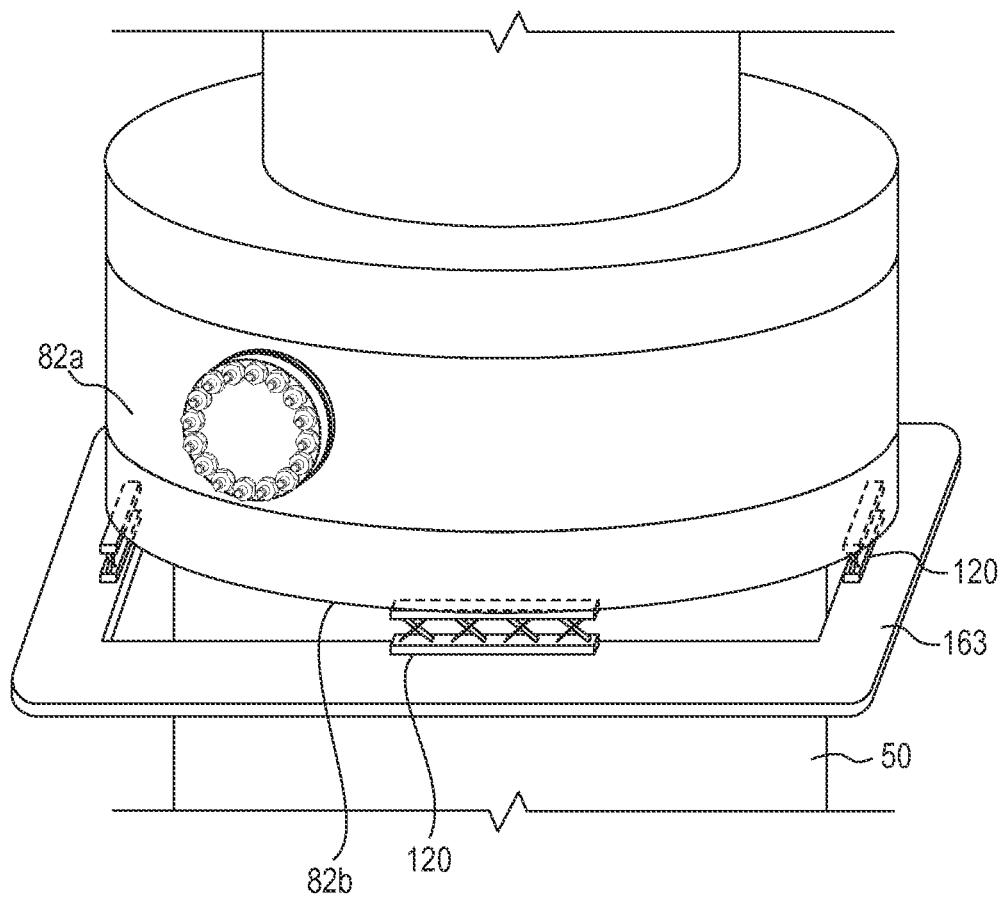
FIG. 6 is the view of FIG. 5 showing the plurality of lifts engaging and lifting the upper reactor vessel vertically with respect to the transporter.

As best shown in FIGS. 5-6, the transporter 100 may include a platform 163 that surrounds all or a portion of an outer circumference of the upper reactor vessel 50. In some embodiments, the platform 163 may be disposed just below the tube sheet portion 82a of the upper reactor vessel 50, which encloses the primary tube sheet 82. The tube sheet portion 82a is formed within the upper reactor vessel 50 with a larger diameter than the diameter of the upper reactor vessel 50 below the tube sheet portion 82a, which surrounds the portion enclosing the plurality of primary tubes 84 that are disposed outboard of the upflow portion 64. The tube sheet portion 82a of the upper reactor vessel 50 defines a ledge 82b that extends radially outward from the portion of the upper reactor vessel 50 that defines the tube sheet portion 82a.

Figure 7:
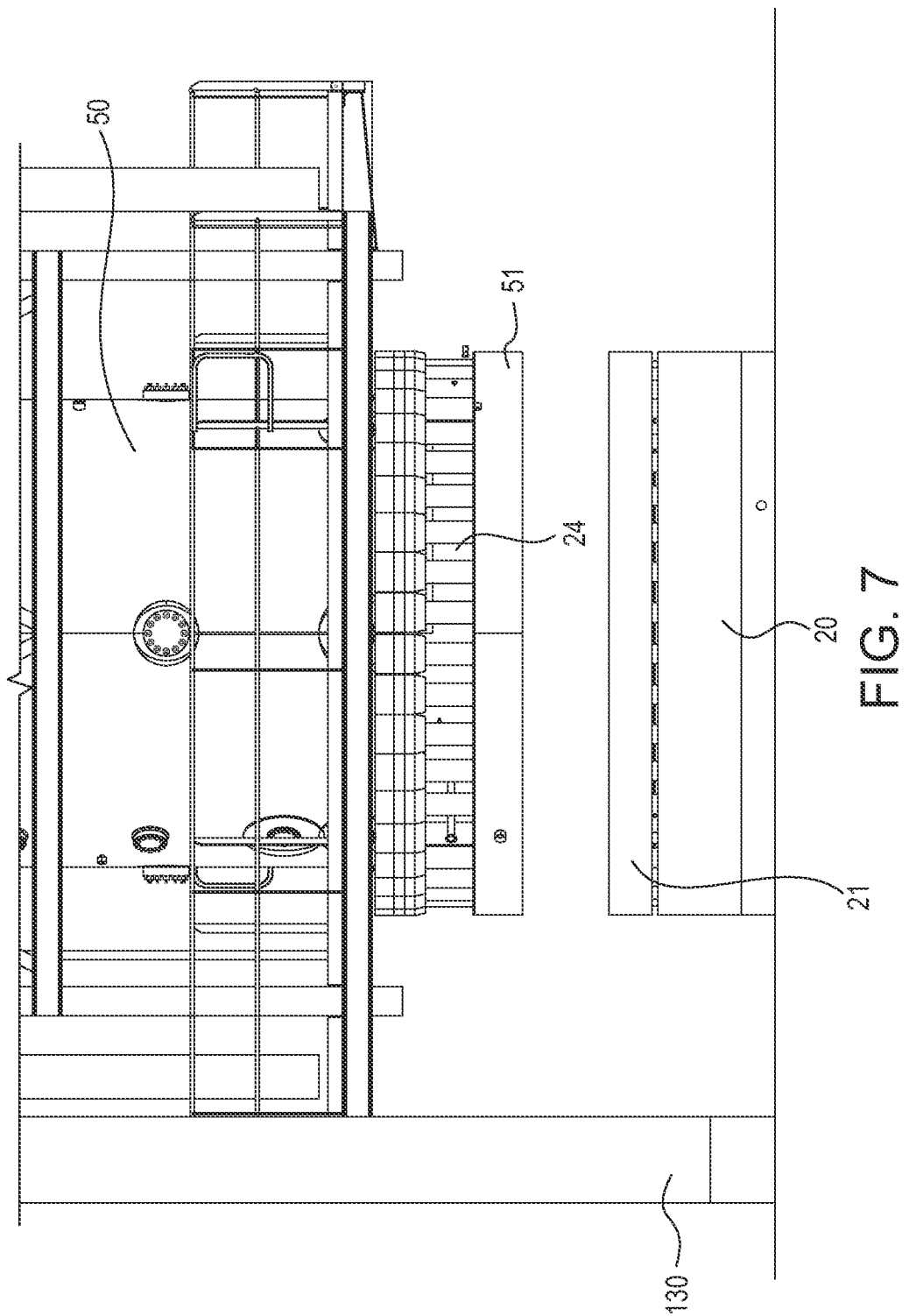
FIG. 7 is a detail view of the opposing flanges of the upper and lower reactor vessels, with the upper reactor vessel lifted off of the lower reactor vessel in accordance with an embodiment of the present invention.
Figure 8:
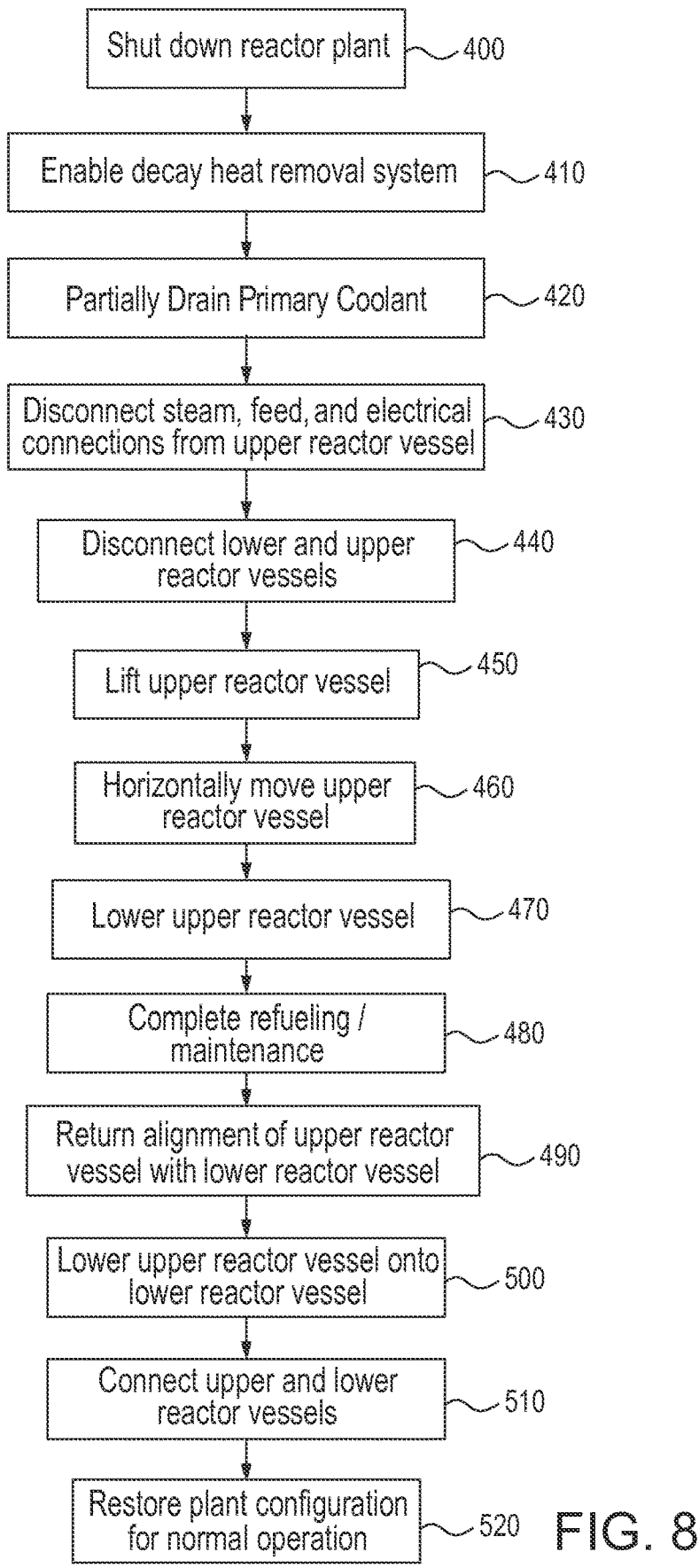
FIG. 8 is a flowchart that describes a method of shutting down the reactor and system of FIG. 2 and configuring the reactor plant for refueling and/or inspection in accordance with an embodiment of the present invention.

In some embodiments, a lift 120, or in some embodiments, a plurality of lifts 120 are disposed upon the platform 163 (or upon another suitable structure of the transporter 100 for interaction with the upper reactor vessel 50) and are positioned to be clear of the tube sheet portion 82a (and the upper reactor vessel 50 overall) during normal operations of the reactor plant 10, but during shutdown conditions, the plurality of lifts 120 may be operated to extend upward to contact the ledge 82b and (once the upper reactor vessel 50 is decoupled from the lower reactor vessel 20) lift the upper reactor vessel 50 off of the lower reactor vessel 20. FIG. 7 provides a side view of the upper reactor vessel 50 lifted vertically off of the lower reactor vessel 20. The plurality of lifts 120 may be hydraulically or electrically operated and are configured to expand, and with sufficient force to translate the upper reactor vessel 50 upward.

In some embodiments, four or another suitable number of lifts 120 may be positioned about the platform 163 and in some embodiments, the plurality of lifts 120 may be configured to simultaneously operate to maintain the upper reactor vessel 50 in a vertical orientation along its length (i.e. with the exposed surface of the lower flange 51 of the upper reactor vessel 50 in a horizontal planar alignment). In some embodiments, the plurality of lifts 120 may be disposed at equal spacing along the circumference of the ledge 82b, while in other embodiments, the plurality of lifts 120 may be otherwise staggered as appropriate for consistent lifting and support of the upper reactor vessel 50 both in static and dynamic conditions (i.e. when the upper reactor vessel 50 is slid horizontally as discussed below). FIGS. 5-6 schematically depict lifts 120 with a scissor mechanism to increase the working height of the lifts 120, although one of ordinary skill in the art will appreciate that other designs of hydraulic or electric lifts (or even other types of suitable lifts) may be provided.

In some embodiments, the lifts 120 (and/or the platform 163) may include structure that engages the tube sheet portion 82a of the upper reactor vessel 50 (or vice versa) when the upper reactor vessel 50 has been lifted vertically by the plurality of lifts 120. The engagement between the upper reactor vessel 50 and the lifts 120 and/or platform 163 may also provide the system with increased support and stability in seismic conditions. The engagement between the tube sheet portion 82a of the upper reactor vessel 50 and the platform 163 or lifts 120 (which in some embodiments are fixed to the platform 163) may be with one or more male portions that are fixed to one of the components and one or more respective female portions that are fixed to the other of the components, with the male and female portions automatically engaging when the lifts 120 vertically raise the upper reactor vessel 50 to a certain height above the lower reactor vessel 20. In other embodiments, other automatic structures could be used, potentially in combination with a manual attachment system (which in some embodiments may be the sole attachment system between the platform 163 and upper reactor vessel 50).

Figure 9:
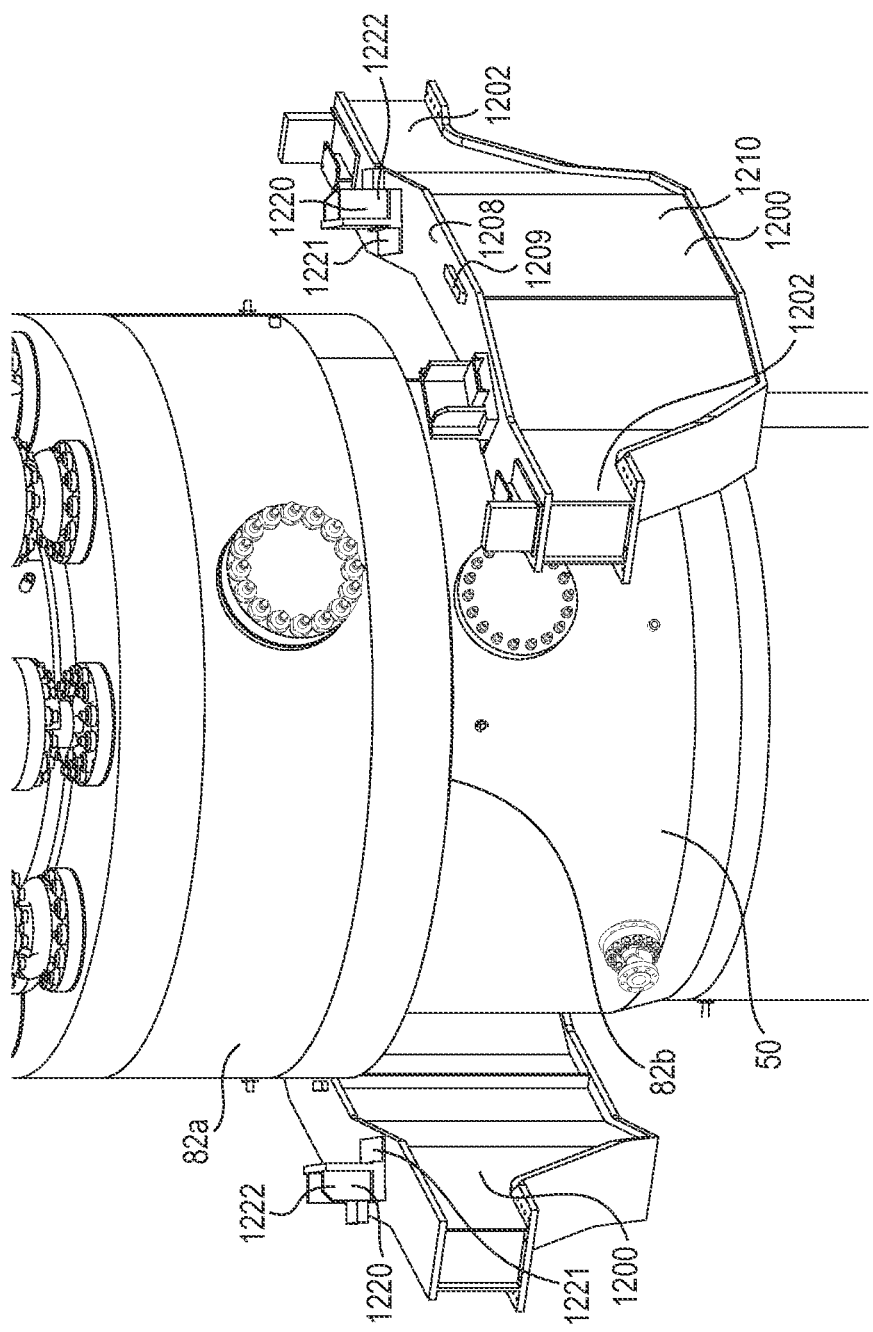
FIG. 9 is a perspective view of a portion of the upper reactor vessel of FIG. 2 in conjunction with a lifting system.
Figure 10:
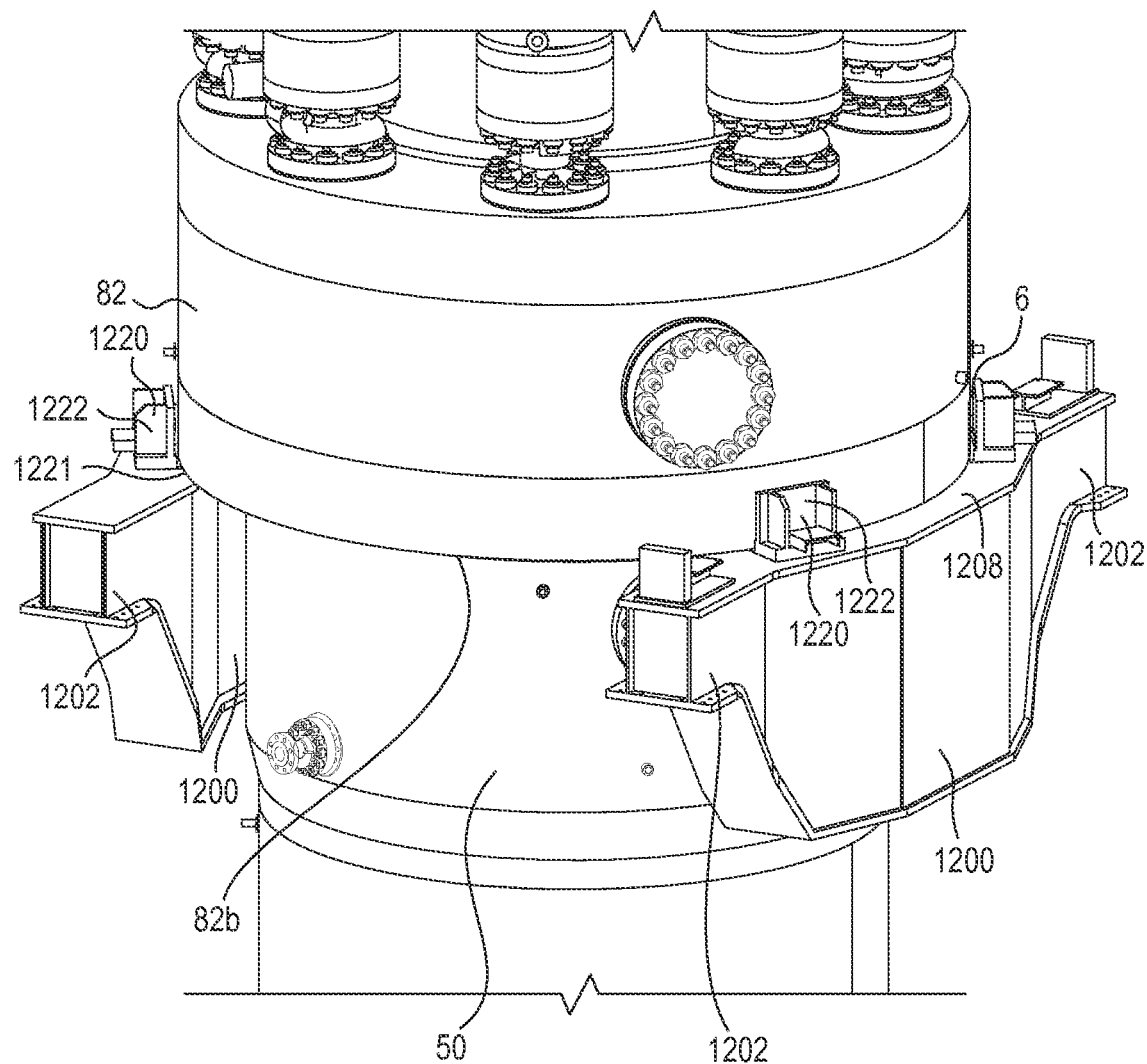
FIG. 10 is the view of FIG. 9 with the lifting system engaging the upper reactor vessel.

As shown in FIGS. 9 and 10, the lifts may include two or more flanges 1200 that are configured to selectively engage the ledge 82b of the tube sheet 82 (or another convenient surface) of the upper reactor vessel 50. The flanges 1200 may be normally positioned outboard of the upper reactor vessel 50 such that the flanges do not contact the upper reactor vessel 50 during normal operations of the plant. The flanges 1200 may each be connected to a hydraulic actuator, such as a ram (not shown, but conventional) at one or more locations upon the respective flange 1200, such as one or both end portions 1202. The end portions 1202 of the flange 1200 may be connected to the respective hydraulic ram with bolted connections (such as through the holes 1203 depicted in the figures, or through another connection. The hydraulic ram may be supported by the transporter 100, and specifically by one of the plurality of platforms (such as platform 160) supported upon the transporter.

The hydraulic rams may be configured to move the respective flanges 1200 laterally toward and away from the upper reactor vessel 50, to allow the flanges 1200 (and in some embodiments via the seat 1221 upon the plurality of supports 1220, or a removable shim 1209, each discussed below) to engage the ledge 82a of the upper reactor vessel 50 when the transporter 100 moves vertically. In some embodiments, the amount of initial vertical motion of the transporter 100 with respect to the (stationary) upper reactor vessel 50 may be limited to avoid any stress on piping and connections that extends from the transporter 100 to the upper reactor vessel 50, and to minimize the amount of disconnection of piping and connections that is needed to lift the transporter 100 with respect to the upper reactor vessel 50.

The flanges 1200 may each include a plurality of supports 1220 that extend from the upper surface 1208 of the flange 1200. The supports 1220 may each include a seat 1221 which contacts the ledge 82b of the upper reactor vessel 50 when so engaged, and a back 1222 that extends upwardly from the seat 1221 and may be a short distance (such as 0.5, 1.0, or 1.5 inches) from the side of the tube sheet portion 82a when the flange 1200 engages the upper reactor vessel 50. The plurality of backs 1222 are each and collectively configured to provide lateral support for the upper reactor vessel 50, such as for seismic concerns, and the plurality of backs 1222 upon each of the flanges 1200 collectively provide lateral support in various lateral directions. In some embodiments, the flange 1200 may include a plurality of backs 1222 disposed upon the top surface 1208 of each flange, but the top surface 1208 of the flange is configured to engage the ledge 82b, with the backs 1222 each providing lateral support when the flanges 1200 engage and lift the upper reactor vessel 50.

FIG. 9 depicts two flanges 1200 disposed upon opposite sides of the upper reactor vessel 50 and positioned in a normal position, each aligned radially outward from the upper reactor vessel 50, and specifically from the tube sheet 82a. FIG. 10 depicts the two flanges 1200 disposed in registry and under the ledge 82, with the flanges 1200 raised (normally by the transporter 100, or alternatively by a separate lifting mechanism) to provide contact between the seats 1221 (with or without the optional shim 1209) and the ledge 82b, with the backs 1222 each positioned with respect to the upper reactor vessel 50 to provide lateral support thereto in various lateral directions.

As best shown in FIGS. 2-4, the transporter 100 may be mounted upon (and hanging by) two or more horizontal rails 202, 204 which are mounted within the containment vessel 1 for the nuclear reactor system 10. In some embodiments, the first and second horizontal rails 202, 204 may be mounted such that they extend across opposite sides of the outer surface of the upper reactor vessel 50, and in some embodiments across a mid-portion of the height of the upper reactor vessel 50. The transporter 100 may include two horizontal cranes 112, 114 (which may the same or similar to structures known as "gantry" cranes) which extend between the first and second horizontal rails 202, 204 with opposite ends of each crane 112, 114 being rollably mounted thereon.

The opposite ends of each crane 112, 114 may be rollably mounted upon the respective horizontal track with a motorized roller 116, with one or more wheels 117 that rolls upon the track. The roller 116 may be electric, hydraulic or powered through another energy source or source of torque. In some embodiments, the wheels 117 of the roller 116 may be selectively locked in a fixed position (operationally when the nuclear plant 10 is aligned for normal operation) to avoid unwanted movement of the rollers 116. In some embodiments, the rollers 116 may each include one or more wheels 117 that rest upon an upper surface of the respective track 202, 204, and in some embodiments may include other wheels (or alignment structures) that engage side portions of the track (normally the outboard side of the track that faces away from the upper reactor vessel 50) for additional alignment between the roller 116 and the track. As will be understood, the rollers 116 may be operated in unison such that the first and second cranes 112, 114 move in unison and in the same direction, to appropriately support the upper reactor vessel 50 while moving horizontally.

As depicted in FIG. 2, each of the first and second cranes 112, 114, may support cross members 113, 115, which are disposed upon opposite sides of the upper reactor vessel 50 and extend between the first and second cranes 112, 114. Each of the cross members 113, 115 may be fixed to both cranes 112, 114 such that the system (i.e. the first and second cranes 112, 114 and the first and second cross members 113, 115) disposed therebetween) defines a rigid support structure, or collar, that fully surrounds the outer circumference of the upper reactor vessel 50.

The cranes 112, 114 and/or the cross member 113, 115 (or other structures within the transporter 100 that are ultimately mounted to the cranes 112, 114 and/or cross members 113, 115), may rigidly support a plurality of vertical support members 130 that extend along a portion of the height of the upper reactor vessel 50 and in parallel with the vertical longitudinal axis of the upper reactor vessel 50. The vertical support members 130 are configured to support a plurality of spaced apart platforms 160 (generally as shown in FIG. 2) 161, 162, 163 (specific potential locations depicted in FIGS. 3-4) that are disposed around the circumference of the upper reactor vessel 50 at locations proximate to the upper reactor vessel 50 where either frequent inspections must occur, or in locations where support for various accessories, cables, and pipes associated with the various systems within the upper reactor vessel 50 must be supported.

In some embodiments, the platforms 160 may be disposed with respect to the upper reactor vessel 50 such that no structure of the platform 160 (and in some embodiments the entire transporter system 100) contacts the upper reactor vessel 50 (or insulation or lagging applied to the outer surface of the upper reactor vessel 50) during normal operation of the reactor plant 10, to prevent any conduction heat transfer from the upper reactor vessel 50 to the transporter 100, which could decrease the thermal efficiency of the system.

A method of preparing a nuclear reactor for refueling is now described. Initially, the nuclear reactor 10 is aligned for normal operation with the upper reactor vessel 50 fixed above the lower reactor vessel 20, with primary coolant flowing therethrough. When shutdown and refueling operations are necessary, the reactor is shut down as is known generally in the art, such as by translating the control rods 6 downward with respect to the fuel rods 5, either gradually, or by a scram (step 400) during a rapid shutdown of the reactor 5 (i.e., placing the reactor 5 in a subcritical condition). After the reactor 5 is shut down, the temperature and pressure of the primary coolant is reduced according to processes known generally in the art. Next, or in parallel, decay heat removal may be intiated to continue to remove decay heat from the reactor during shut down operations (step 410), by, for example, establishing a long-term decay heat removal system (not shown) in thermal communication with the nuclear reactor 5.

After the ability to remove decay heat from the reactor is verified, the primary coolant is drained from the overall reactor plant, such that level of primary coolant is preferably just below the top of the flange 21 of the lower reactor vessel 20 (step 420). Next, the steam piping is disconnected from the one or more steam outlets 74 on the upper reactor vessel 50, and feed piping disconnected from the one or more feedwater inlets 72, and any other fluid connections with the upper reactor vessel 50 (such as, for example, a pressure relief system) are disconnected therefrom. Finally, any electrical connections with the upper reactor vessel 50 are removed (as needed to vertically and horizontally translate the upper reactor vessel 50) (step 430).

Next, upper and lower reactor vessels 50, 20 are disconnected (step 440) by removing or withdrawing a plurality of fasteners 24 from at least the lower vessel flange 21, and potentially from both flanges 21, 51. In some embodiments, the fasteners 24 may be removed from the upper reactor vessel 50, while in other embodiments, the fasteners 24 may be stowed in a fixed position upon the upper reactor vessel 50. Once the fasteners 24 are withdrawn, the plurality of lifts 120 are operated, upon the platform 163 or upon another convenient surface of the transporter 100, to engage the upper reactor vessel 50, such as the ledge 82b upon the tube sheet portion 82a of the upper reactor vessel 50 (step 450).

In some embodiments, the lifts 120 are simultaneously operated and at the same speed such that each lift 120 engages the upper reactor vessel 50 at substantially the same time and at substantially the same speed to maintain the vertical alignment of the upper reactor vessel 50 as it is lifted vertically off of the lower reactor vessel 20. In embodiments where the upper reactor vessel 50 and lifts 120 (and/or platform 163) including the self-engagement structures or mechanisms (or are configured to receive the manual engagement structures described above), these self-engagement structures or mechanisms (or the manual engagement structures) are implemented to fix the upper reactor vessel 50 ultimately to the transporter.

The upper reactor vessel 50 is lifted vertically by the plurality of lifts 120 until there is a sufficient space between the upper and lower reactor vessels 20, 50. In some embodiments, the lifts may lift the upper reactor vessel 50 a distance within a range of up to about one foot (inclusive of all distances below one foot). In some embodiments, the upper reactor vessel 50 may be lifted six inches. In still other embodiments, the upper reactor vessel 50 may be lifted a larger distance as needed, such as between one and five feet (inclusive of all distances therewithin). The plurality of lifts 120 may be configured to lift the upper reactor vessel 50 a suitable distance to allow it to clear all components associated with the lower reactor vessel 20, such that the upper reactor vessel 50 can be translated horizontally away from alignment with the lower reactor vessel 20. Once the upper reactor vessel 50 is lifted, the transporter 100 is energized to horizontally translate the upper reactor vessel away from alignment with the lower reactor vessel 20 (step 460). The transporter 100 causes the plurality of rollers 116 that rest upon the first and second tracks 202, 204 (and may be connected one of the first or second cranes 112, 114, or other support structure forming the collar or the transporter 100) to roll upon the tracks 202, 204 to translate the upper reactor vessel 50 away from alignment with the lower reactor vessel 20.

When the transporter 100 and upper reactor vessel 50 reach the final location for maintenance and inspection, in some embodiments, the plurality of lifts 120 may lower the upper reactor vessel 50 to its normal height, to obtain additional stability and minimize the operation of the plurality of lifts 120 (step 470). In some embodiments, additional automatic or manual systems may be implemented to fix the transporter 100 (or various components of the transporter 100) to the upper reactor vessel 50 for support to the upper reactor vessel 50.

In some embodiments, the containment 1 may include a lower vessel compartment 300 and one or more auxiliary compartments 240 located outboard of the lower vessel compartment 300. In these embodiments, transporter 100 rolls the upper reactor vessel 50 out of the lower vessel compartment 300 and to one of the auxiliary compartments 240, where inspection of the inner volume of the upper reactor vessel 50 can occur without interfering with refueling operations of the lower reactor vessel 20 within the lower vessel compartment 300. In some embodiments, the lower vessel compartment 300 and the auxiliary compartment 240 may be separated with a movable panel or door 242 (FIG. 4) or other structure that selectively separates the two compartments, both to minimize radiation exposure within the auxiliary compartment, as well to provide a water seal between the compartments in situations where the lower vessel compartment 300 is flooded for decay heat removal or for use in refueling activities.

Once the refueling and inspection work is completed (step 480), the upper reactor vessel 50 is returned to alignment with the lower reactor vessel 20 by operating the plurality of rollers 116, cranes 202, 204 or other structure of the transporter 100 (step 490). In embodiments where the upper reactor vessel 50 was lowered prior to maintenance and inspection, the plurality of lifts 120 again raise to the upper reactor vessel 50 to the lifted height to allow for clearance of the upper reactor vessel 50 above the lower reactor vessel 20.

Upon proper alignment of the upper reactor vessel 50 above the lower reactor vessel 20, the plurality of lifts 120 are lowered to lower the upper reactor vessel 50 upon the flange 21 of the lower vessel 20 (step 500). The plurality of fasteners 24 are placed to compress the opposite flanges 21, 51 together (step 510), and the reactor and steam plant is restored for proper operation (i.e. by restoring steam and feed piping, electrical connections, etc.) and the plant is restored for operation (step 520).

In embodiments where the nuclear plant 10 is operated with dual operating nuclear reactor plants, which may be designed to operate simultaneously (with the same or different turbines) together, or independently, the first and second rails 202, 204 may extend through the containment 1 to interact with a second transporter system (not shown) that surrounds the other reactor vessel (not shown), to allow for separation and movement of the upper reactor vessel of the other reactor vessel (either to the same auxiliary compartment 240, or a different auxiliary compartment (not shown)) from the other plant for refueling, inspection and/or maintenance.

In some embodiments, a transporter may be provided in conjunction with different types of nuclear reactor plants, such as other types of PWRs or BWRs. By way of example, in PWR designs where the pressurizer and steam generator are fluidly connected to the reactor vessel, but are mounted externally of the reactor vessel, a transporter may be provided to selectively engage and lift a reactor vessel head (which normally supports external control rod drive mechanisms as well as other components or structures of a reactor plant) to allow the vessel head to be moved away and returned to the reactor vessel as needed for refueling and maintenance operations. The transporter may be configured to constantly surround (but in some embodiments to not make contact in a normal operational configuration) the reactor vessel for convenient engagement and movement of the reactor vessel head, such that operations to move the reactor vessel head play only a minimal role in the overall time needed to perform certain maintenance and refueling activities where access to the internals of the reactor vessel is necessary. One of ordinary skill in the art would understand how to modify the transporter 100 and its associated structure disclosed above with respect to the nuclear reactor 10 in order to operate with respect other types of reactor designs with a thorough review of this disclosure.

While the preferred embodiments of the disclosure have been described, it should be understood that the disclosure is not so limited and modifications may be made without departing from the disclosure. The scope of the invention is defined by the appended claims, and all devices, structures, systems, and methods that come within the meaning of the claims, either literally or by equivalence, are intended to be embraced therein.

The invention claimed is:

1. A system for refueling a nuclear reactor, comprising:
a lower reactor vessel comprising a plurality of fuel rods and a plurality of control rods disposed therein, the lower reactor vessel further comprising an upper flange;
an upper reactor vessel comprising a steam generator and pressurizer disposed therein, the upper reactor vessel further comprising a lower flange that matingly engages the upper flange of the lower reactor vessel; and
a transporter surrounding an outer surface of the upper reactor vessel, wherein the transporter includes a collar surrounding the outer surface of the upper reactor vessel, the collar including first and second wheels affixed thereto that are disposed upon respective first and second horizontal tracks, the first and second horizontal tracks being parallel to each other, and
one or more of hydraulically-operated and electrically-operated lifts, each lift being secured to the collar and extendable upwardly to engage the upper reactor vessel and translate the upper reactor vessel vertically toward or away from the lower reactor vessel, and the transporter translates the upper reactor vessel horizontally toward or away from vertical alignment with the lower reactor vessel.

2. The system of claim 1, wherein the upper reactor vessel comprises an upper flange disposed concentrically around the outer surface thereof, wherein the upper flange of the upper reactor vessel is disposed below the pressurizer, wherein the one or more lifts are extendable upwardly to engage the upper flange of the upper reactor vessel to urge the upper reactor vessel vertically with respect to the lower reactor vessel when the transporter translates vertically.

3. The system of claim 1, wherein the collar further comprises third and fourth wheels that are disposed upon the first and second tracks, respectively, and with a spacing between the first and third wheels is equal to a spacing between the second and fourth wheels.

4. The system of claim 1, further comprising a plurality of vertical support members fixed to the collar and disposed in a mutually spaced relationship around the outer surface of the upper reactor vessel.

5. The system of claim 4, wherein the plurality of vertical support members collectively support a plurality of platforms arranged in a vertical spaced-apart fashion, each of the plurality of platforms extend around the outer surface of the upper reactor vessel.

6. The system of claim 4, wherein each of the vertical support members are configured to be translated with the collar.

7. The system of claim 1, wherein the transporter comprises horizontal first and second crane members, each of the first and second horizontal crane members are rollably mounted upon respective first and second horizontal tracks on opposite ends of the crane member, wherein the first and second horizontal tracks are aligned on opposite sides of the upper reactor vessel, and the first and second crane members collectively support first and second cross members disposed upon opposite sides of the upper reactor vessel.

8. The system of claim 1, wherein the plurality of control rods are configured to reciprocate axially with respect to the lower reactor vessel.

9. A method, comprising:
providing a nuclear reactor primary plant within a stationary lower reactor vessel that encloses a plurality of fuel rods and a plurality of control rods, the lower reactor vessel comprising an open top defined by a first flange,
providing a movable upper reactor vessel that encloses a steam generator and a pressurizer, the upper reactor vessel comprising an open bottom defined by a second flange that matingly engages the first flange during normal operation of the nuclear reactor,
providing an upper reactor vessel transporter that surrounds the upper reactor vessel, the transporter comprising a collar surrounding an outer surface of the upper reactor vessel, the transporter further comprising at least first and second sets of wheels affixed to the collar that are mounted upon respective first and second horizontal tracks that are both disposed upon opposite sides of the upper reactor vessel and are parallel to each other, and
providing one or more lifts secured to the collar, wherein extension of the plurality of lifts upwardly causes engagement with the upper reactor vessel and urges the reactor vessel upwardly with respect to the lower reactor vessel.

10. The method of claim 9, further comprising providing a plurality of vertical support members fixed to the collar and spaced apart around the upper reactor vessel, wherein the plurality of vertical support members collectively support a plurality of platforms arranged in a vertical spaced-apart fashion, the platforms each extend around the outer surface of the upper reactor vessel.

11. A method of refueling a nuclear reactor, comprising:
shutting down and cooling down the nuclear reactor, the nuclear reactor comprising a reactor vessel and steam system and a feedwater system;
removing decay heat from the nuclear reactor;
isolating the reactor vessel from the steam system and the feedwater system connected to the nuclear reactor during normal operation of the nuclear reactor;
disconnecting a lower reactor vessel enclosing nuclear fuel and a plurality of control rods from an upper reactor vessel enclosing a steam generator and pressurizer disposed above the lower reactor vessel; and
lifting the upper reactor vessel upwardly from the lower reactor vessel and sliding the upper reactor vessel away from the lower reactor vessel, to allow access to the lower reactor vessel to remove old nuclear fuel and/or add new nuclear fuel, wherein the upper reactor vessel is surrounded by a transporter, the transporter including a collar that surrounds the upper reactor vessel and being rollably connected to first and second parallel rails disposed upon opposite sides of the upper reactor vessel by one or more wheels that are secured to the collar, and the transporter further comprises one or more lifts that secured to the collar are extendable upwardly to engage the upper reactor vessel to upwardly translate the upper reactor vessel upwardly away from the lower reactor vessel.

* * * * *